United States Patent Office 3,329,628
Patented July 4, 1967

3,329,628
SYNTHETIC ZEOLITES
Elroy Merle Gladrow and William Judson Mattox, Baton Rouge, La., assignors to Esso Research and Engineering Company, a corporation of Delaware
No Drawing. Filed Apr. 19, 1963, Ser. No. 274,301
16 Claims. (Cl. 252—453)

This invention relates to an improved process for preparing synthetic crystalline alumino-silicate zeolite materials, the products thereby produced, and their use in catalytic conversion processes. Particularly, it relates to the preparation of crystalline alumino-silicate zeolite materials having relatively high silica to alumina mole ratios and distributed throughout a siliceous cogel matrix. More particularly, it relates to the preparation of crystalline alumino-silicate zeolite materials having relatively high silica to alumina mole ratios and distributed throughout a siliceous cogel matrix, which are crystallized from reaction mixtures having relatively low silica to alumina mole ratios and relatively low water content.

Crystalline alumino-silicate zeolites, commonly referred to as "molecular sieves," are well known in the art. They are characterized by their highly ordered crystalline structure and uniformly dimensioned pores, and are distinguishable from each other on the basis of composition, crystal structure, adsorption properties and the like. The term "molecular sieves" is derived from the ability of these zeolite materials to selectively adsorb molecules on the basis of their size and form. The various types of molecular sieves may be classified according to the size of the molecules which will be rejected (i.e. not adsorbed) by a particular sieve. A number of these zeolite materials are described, for example, in U.S. Patent 3,069,362 wherein they are characterized by their composition and X-ray diffraction characteristics.

The crystalline alumino-silicate zeolites within the purview of the present invention are characterized by uniform pore dimensions in the general range of between about 4 to 15 A. in diameter. Among the well-recognized types of zeolites are the "Type X," "Type Y," mordenite, etc., which differ in the ratio of silica to alumina contained in the final crystalline structure, i.e. Type X having a ratio below 3, e.g. about 2 to 3, Type Y having a ratio above 3, e.g. about 3 to 7, and mordenite having a ratio of about 7 to 11, e.g. 9 to 10.

In addition to their extensive use as adsorbents for hydrocarbon separation processes and the like, it has recently been found that crystalline alumino-silicate zeolites, particularly after cation exchange to reduce $Na_2O$ content, are valuable catalytic materials for various processes, particularly hydrocarbon conversion processes. However, the extremely fine size crystals which are usually produced in the synthetic manufacture of molecular sieves are generally unsuitable for use in moving or fluidized bed processes because of the difficulty in fluidizing them without excessive loss due to attrition and carry-over. Additionally, the crystalline zeolites are frequently unsuitable for direct use as catalysts because of their extremely high activities which cause difficulties in controlling the desired product selectively. Accordingly, it has recently been discovered that an improved form of crystalline alumino-silicate zeolite, which is suitable for moving or fluidized bed operations, and particularly for hydrocarbon conversion processes, can be formed by admixing the crystalline zeolite with a siliceous cogel. The term "cogel" as used herein is intended to include gelatinous precipitates or hydrogels of admixtures of hydrous silica and one or more hydrous oxides of metals selected from Groups II-A, III-A and IV-B of the Periodic Table, e.g. alumina, magnesia, zirconia, titania, etc. Silica-alumina cogel is especially preferred. The resulting composite, after drying, consists of crystalline zeolite distributed through a siliceous cogel matrix and has been found to exhibit improved catalytic selectivity, stability and fluidization properties.

In general, the chemical formula of the anhydrous crystalline alumino-silicate zeolites, expressed in terms of moles may be represented as:

$$0.9 \pm 0.2\ Me_{2/n}O : Al_2O_3 : XSiO_2$$

wherein Me is selected from the group consisting of metal cations and hydrogen, $n$ is its valence, and X is a number from about 1.5 to about 12, preferably 2 to 10. The zeolite as produced or found in nature normally contains an alkali metal such as sodium or an alkaline earth metal such as calcium.

The processes for producing such crystalline zeolites synthetically are well known in the art. They involve crystallization from reaction mixtures containing: $Al_2O_3$ as sodium aluminate, alumina sol and the like; $SiO_2$ as sodium silicate and/or silica gel and/or silica sol; and metal oxide as alkaline hydroxide, e.g. sodium hydroxide, either free or in combination with the above components. Careful control is kept over the soda concentration of the mixture, the proportions of silica to alumina and soda (metal oxide) to silica, the crystallization period, etc., to obtain the desired product. A conventional scheme for preparing Type X or Type Y crystalline alumino-silicate zeolites would be as follows:

Colloidal silica or silica hydrosol is mixed with a solution of sodium hydroxide and sodium aluminate at ambient temperatures to produce a reaction mixture having the following molar ratios of reactants:

TABLE I

| Reactants, Mole Ratio | Type X | Type Y |
|---|---|---|
| $Na_2O/SiO_2$ | 0.7 to 1.5 | 0.28 to 0.45. |
| $SiO_2/Al_2O_3$ | 2.5 to 5.0 | 8 to 30. |
| $H_2O/Na_2O$ | 20 to 60 | 20 to 60. |
| $SiO_2/Al_2O_3$ in product | 2 to 3 | 3 to 7, preferably 4–6. |

The reaction mixture may then be allowed to digest at ambient temperatures for periods of up to 40 hours or more, in order to aid crystallization. It is then heated at 180° to 250° F., e.g. 200° to 220° F., for a sufficient period to crystallize the product, e.g. up to 200 hours or more, typically 50 to 100 hours. The crystalline, metallic alumino-silicate is separated from the aqueous mother liquor by decantation or filtration and washed to recover a crystalline product having a particle size of about 0.05 to 5 microns.

In order to incorporate the crystalline alumino-silicate product into the siliceous cogel matrix, the zeolite crystals are simply added to a hydrogel such as a silica-alumina hydrogel and the resulting mixture is homogenized by passage through a blending apparatus, such as a colloid mill, ball mill, and the like. The homogenized slurry is then formed into particles of a size range desired for fluidized bed operations. This is conveniently accomplished by spray drying, although other methods may be employed.

The present invention is concerned with an improved process for preparing the above-mentioned zeolite-cogel matrix composite products and the products thereby obtained. As hereinbefore described, previous processes have generally employed a distinct separation of the zeolite product crystals from the mother liquor prior to their incorporation into the cogel matrix material. It is one of the principal purposes of the present invention to effect the formation of a zeolite-siliceous cogel matrix composite product by a procedure which does not require this distinct separation of the zeolite product crystals from their mother liquor. By means of the present process, the various intermediate steps, e.g. filtration, washing, drying and final reslurrying of the zeolite crystals, are conveniently eliminated without deleteriously affecting product quality.

The process of the present invention involves admixture in the desired proportions of an aqueous slurry comprising a cogel of hydrous silica and one or more hydrous oxides of metals selected from Groups II-A, III-A and IV-B of the Periodic Table, preferably a silica-alumina cogel, with the mother liquor containing precipitated zeolite crystals obtained from the crystallization step, and the subsequent evaporation of water from the resulting fluid slurry mixture to form the desired zeolite-cogel matrix composite product comprising zeolite crystals embedded in the desired cogel. The evaporation is preferably accomplished by a rapid drying technique, e.g. spray drying. It will be observed, therefore, that a requirement of the present process is that the resulting slurry mixture, prior to evaporation of water, be fluid in nature so that rapid drying, e.g. spray drying, may be accomplished.

The aqueous cogel slurry of hydrous silica and one or more of the above-mentioned hydrous metal oxides may be derived from various sources and will generally have a total solids content of about 3 to 20 wt. percent, preferably 5 to 12 wt. percent. It has been found most preferable to utilize a reverted hydrogel of the desired materials, e.g. a silica-alumina cogel, which is temporarily made fluid by rigorous agitation (e.g. with a colloid mill) and/or addition of water to form the corresponding hydrosol. The term "cogel slurry" is thus meant to include colloidal mixtures of the desired metal oxides in water. The use of such reverted hydrogels has been found desirable since upon their admixture with the zeolite-containing mother liquor a pumpable fluid slurry is formed which may be conveniently spray dried, etc.

The hydrogels useful in the present invention may be used as supplied commercially or may be separately prepared. For example, a silica-alumina hydrogel may be prepared by first producing a hydrous precipitate of silica by mixing a solution of sodium silicate with an acid, e.g. sulfuric acid, to produce a slurry having a pH below 7, usually below about 4; then adding a solution of an aluminum salt, e.g. aluminum sulfate; and adjusting the pH of the mixture to above about 4 by addition of alkaline material, e.g. ammonia, in order to precipitate the alumina. The amount of aluminum salt used will normally be that required to give a silica-alumina precipitate containing about 8 to 40 wt. percent, preferably 12 to 30 wt. percent (dry basis) of $Al_2O_3$. This mixture may then be slurried and fluidized in a sufficient quantity of water and then combined with the mother liquor slurry according to the present invention.

It is to be noted that the hydrogels formed by the above procedure, as well as the commercially available forms which, if supplied in an "unwashed" state, contain a significant amount of sodium salt impurity. If desired, the impure hydrogel may be water washed to remove these soluble impurities prior to admixture with the mother liquor. More preferably, it may be left in an unwashed state and the washing operation performed on the final dried zeolite-siliceous cogel matrix composite material. The latter method is preferable since the zeolite also contains water soluble impurities and two washing operations may thus be combined.

The final zeolite-cogel matrix will generally contain about 2 to 80 wt. percent of pure crystalline zeolite, depending upon the intended use of the final composite product.

The process of the present invention may be advantageously employed in the manufacture of the Type Y zeolites which contain relatively high silica to alumina ratios and are represented by the formula:

$$0.9 \pm 0.2\ Na_2O:Al_2O_3:XSiO_2$$

wherein X is a number above 3, e.g. 3 to 7. It is to be understood, however, that the process of the present invention can also be applied to the preparation of the so-called Type X zeolites having silica to alumina mole ratios of below about 3.

In connection with the preparation of Type Y zeolites, an improved process has recently been discovered which has proven valuable in eliminating certain problems experienced in prior processes. It had been found that in order to obtain crystalline Type Y zeolites containing the necessarily high silica to alumina molar ratio content, it was necessary to use very high ratios of silica to alumina in the reaction mixture, e.g. ratios of 8 to 40. With lower ratios in the reaction mixture other crystalline zeolite types were obtained. However, the use of such high ratios of silica to alumina was subject to a major problem of extremely slow crystallization rate and to the lesser problems of low utilization of silica, i.e. low incorporation of silica into the final product, and variable composition of the zeolite. Thus, even where silica to alumina ratios of about 8 to 10 were used it was found necessary to carry out the crystallization in two steps; namely, a prolonged digestion step at ambient temperature, and a prolonged crystallization step at elevated temperature. It was observed that the proportions of each of the reactant materials in the reaction mixture were critical and, to a large degree, determined the crystallinity of the product, the yield, the crystallization time, and the ratio of silica to alumina obtained in the crystalline product. Accordingly, it was recently discovered that careful control of these proportions within certain prescribed limits provided a remarkable improvement over the performance of prior processes. By means of this preferred formulation, which will be termed the "high crystalline yield" formulation, excellent quality zeolite product was obtained in a significantly reduced crystallization time, with a relatively high utilization of silica and a relatively low unreacted reagent content in the reaction mixture after crystallization of the product.

The improvement of the present invention is particularly useful when the aforementioned preferred "high crystalline yield" formulation is used to synthesize crystalline Type Y zeolite, for the following reasons:

Firstly; the process of the present invention involves the direct admixture of the hydrous silica-metal oxide aqueous cogel slurry and the alumino-silicate product crystals contained in their mother liquor, and the subsequent rapid evaporation of the resulting mixture. Therefore, any extraneous unreacted material, e.g. soluble salts, from the original reaction mixture will be carried along into the dried product; whereas in the conventional prior art processes, involving filtration of the zeolite crystals, such material would be removed in the liquid filtrate. It will be appreciated that because of the process of the present invention does not employ this filtration step, the amount of this extraneous soluble material should preferably be minimized in order to obtain the highest order of crystallinity for the final zeolitic product, since the subsequent rapid evaporation of the resulting admixture will cause it to be incorporated in the final product. Thus, to attain the desired degree of purity in the final zeolite material, it will be preferred to employ the "high crystalline yield" formulation which is capable of forming zeolite crystals with a maximum utilization of reagents and a consequent minimum of extraneous material, e.g. excess unreacted reagents, soluble salts, etc. It is to be understood, however, that the process of the invention can be generally applied to the preparation of synthetic crystalline zeolites using varying reaction mixture compositions to produce varying degrees of product quality. Additionally, since the final composite product will comprise zeolite embedded in an amorphous siliceous cogel matrix, for many purposes the presence of extraneous amorphous matter will not be excessively detrimental.

Secondly, a major problem has been experienced with the "high crystalline yield" formulation; namely, that the zeolite crystals formed are extremely fine and consequently difficult to separate from the mother liquor by conventional separation means, e.g. filtration, sedimentation, centrifugation, etc. Thus, when such conventional means are used to separate the product crystals from the mother liquor, only a partial separation of the crystals is accomplished, due to either plugging of the filter medium or extremely poor settling characteristics, which thereby seriously limit the rate of liquid removal and product recovery. Because of these difficulties it becomes a practical economic necessity to either effectively improve this product separation step or, contrarily, to eliminate it entirely. Thus, an added incentive for the process of the present invention, when combined with the preferred "high crystalline yield" formulation, resides in the elimination of this difficult separation procedure without deleteriously affecting the quality of the final product and without the attendant problems associated with the prior art processes.

The preferred Type Y zeolite synthesis utilizing the "high crystalline yield" formulation will now be described in connection with the improved process of the present invention.

Type Y zeolites are prepared from reaction mixtures having relatively low silica to alumina and silica to soda ($Na_2O$) ratios and low water content, to form highly crystalline alumino-silicate zeolites. The four principal reactants present in the reaction mixture of the "high crystalline yield" formulation are the same as previously described for conventional processes; namely, alumina (as sodium aluminate, alumina sol (etc.), silica (as sodium silicate, silica sol, silica gel, etc.), soda (as sodium hydroxide, etc.), and water. Depending on the source of the reactants, the proportions of other reactants are adjusted so that the relative ratios of the reactants are as indicated below in Table II. As hereinbefore mentioned, these proportions are critical in determining crystallinity, yield, and the ratio of silica to alumina of the crystalline product. To produce Type Y zeolites (by the preferred formulation) having the desired silica to alumina ratios of 3 to 7, preferably 4 to 6, the reactant mole ratios should fall within the following ranges:

TABLE II

|  | General | Preferred | Specific |
| --- | --- | --- | --- |
| $Na_2O/SiO_2$ | 0.25 to 0.60 | 0.32 to 0.57 | 0.33 to 0.55. |
| $SiO_2/Al_2O_3$ | 4 to less than 8 | 5.0 to 7.5 | 6 to 7. |
| $H_2O/Na_2O$ | 20 to 40 | 20 to 40 | 20 to 30. |
| $Na_2O/Al_2O_3$ | 1.6 to 3.5 | 2.1 to 3.4 | 2.20 to 3.40. |

The solids content of the resulting reaction mixture is within the range of about 24 to 40 wt. percent, e.g. 30 to 37 wt. percent.

The reaction mixture is digested at ambient temperature of about 60 to 100° F. for periods of about 1 to 40 hours, e.g. 2 to 10 hours, to aid the crystallization process. It is then heated at a temperature of 180° to 250° F., preferably 200° to 220° F., for a sufficient period to crystallize the zeolite product and preferably to achieve maximum crystallinity of product, as determined by periodic sampling and analysis of the reaction mixture. Crystallization times of 5 to 50 hours, preferably 20 to 40 hours, have been found suitable, which times are significantly shorter than those required by the conventional processes hereinbefore described. The crystallization process may be stopped at the desired point by quenching the reaction mixture with additional water.

Briefly, therefore, the recently developed "high crystalline yield" process involves, for example, the admixture of a sufficient amount of sodium aluminate, sodium hydroxide, and an aqueous sol of colloidal silica in the presence of added water to form a homogenous mixture having the molar ratios as indicated in Table II; a digestion period, e.g. 2 to 10 hours, at ambient temperature; and a subsequent aging period at elevated temperature, e.g. 200 to 220° F., for a sufficient period of time (e.g. 20 to 40 hours) to form synthetic Type Y crystalline sodium alumino-silicate zeolite.

In embodying the "high crystalline yield" process in the process of the present invention, the total slurry of crystalline Type Y zeolite contained in its mother liquor is added to the aqueous silica-metal oxide cogel slurry, e.g. a reverted hydrogel, to form a fluid mixture in accordance with the procedures hereinbefore described. The fluid composite mixture is then subjected to high agitation conditions (e.g. with a colloid mill) to produce a fine dispersion, and is then subjected to a rapid evaporation technique, such as spray drying, flash drying, etc.

The spray drying step comprises spraying the composite mixture through nozzles into a tower containing hot flowing gases at a temperature at the nozzles in the range of about 400 to 650° F. This procedure is desired because of the increased attrition resistance achieved due to the spherical nature of the particles obtained, as well as the excellent particle size distribution useful for fluidized bed processes, e.g. predominantly 20 to 80 micron average particle diameter. Thus, by means of this spray drying step, a highly porous solid is obtained having improved attrition resistance due to the spherical nature of the particles.

After the spray drying step, the resulting zeolite-cogel matrix composite is preferably water washed to remove water-soluble material and oven dried. The dry product is then normally subjected to a calcination treatment at temperatures above about 500° F., e.g. 500 to 1500° F., for about 8 to 24 hours. It may also be subjected to steam treatment at these temperature levels, e.g. 5 to 30 hours at 850 to 1200° F.

The zeolite-cogel matrix composite reaction mixture (containing added water if necessary to make it pumpable) will generally have a solids content in the range of about 2.5 to 10 wt. percent, preferably 4 to 7 wt. percent, prior to the evaporation step (e.g. spray drying). The spray dried composite of the zeolite embedded in the matrix material will generally contain about 2 to 80 wt. percent zeolite. When the composite is to be used as an adsorbent high zeolite content compositions will usually be preferred, whereas for use as a catalyst low zeolite content compositions will be preferred.

The spray dried composite of sodium form zeolite embedded in the cogel matrix material prepared in accordance with the present invention has been found to exhibit superior catalytic properties for catalytic cracking, hydrocracking, etc. When a catalytic material is desired, it will be preferable to subject the zeolite-cogel matrix composite to ion exchange prior to final water washing and conventional drying. Ion exchange may be accomplished with any suitable cation to give the desired catalytic properties. Preferably, the ion exchange is accomplished with a metal cation or a hydrogen-containing cation so as to reduce the sodium content of the zeolite to less than 10 wt. percent (as $Na_2O$), preferably to about 1 to 5 wt. percent, based on the zeolite crystals. The metal cation can be any metal of Groups I to VIII and the rare earth metals, but preferably is a member of the group consisting of Groups II, III, IV, V, VI–B, VII–B, VIII, and rare earth metals. Particularly preferred for use as a cracking catalyst are the alkaline earth metals and especially magnesium and/or calcium. The hydrogen-containing cation is preferably a hydrogen ion or an ammonium ion.

For hydrocracking operations it has been found preferable to de-cationize the composite by initial exchange with ammonium ion followed by controlled heating at about 600 to 1000° F., or by exchange with hydrogen ion by treatment with dilute acids, to again reduce the soda content to within the above-mentioned ranges. The resulting de-cationized composites are then useful as supports for noble metal catalytic agents. Impregnation of noble metals may be accomplished, for example, by treating the composite with a platinum or palladium salt or an ammonium complex of these elements, e.g. tetraammine platinous chloride, palladium chloride, etc. The amount of catalytic metal based on the zeolite component in the finished catalyst is generally between 0.01 and about 5.0 wt. percent, preferably 0.1 to 3.0 wt. percent. The catalyst is then usually subjected to a heat or hydrogen treatment at elevated temperatures, e.g. 500 to 1500° F., to reduce the platinum group metal, at least in part, to its elemental state.

The aforementioned ion exchange is accomplished by treatment of the siliceous cogel matrix-zeolite composite with a suitable salt solution of the aforementioned metals or the hydrogen-containing cation at a temperature of 60 to 170° F. via conventional ion exchange techniques. The resulting ion exchanged composite will contain at least 1 to 2 wt. percent, preferably 3 to 20 wt. percent, of the metals based on the weight of the zeolite. Suitable salt solutions include the sulfates, nitrates, and chlorides of magnesium, calcium, barium and iron; hydrogen; ammonia; etc. After ion exchange the composite is thoroughly water washed, oven dried at about 200 to 350° F. and finally calcined at 750 to 1200° F. The final calcined product will generally comprise about 2 to 30 wt. percent crystalline zeolite embedded in 98 to 70 wt. percent of the cogel matrix.

The invention will be further understood by reference to the following examples, which are given for illustrative purposes only and are not intended to be limiting.

EXAMPLE 1

*Part A.—Preparation of zeolite Y-matrix by process of the invention*

A crystalline alumino-silicate zeolite, having a silica to alumina mole ratio above 3, was prepared in the following manner. A slurry mixture of 314 grams of commercial sodium aluminate containing 65 wt. percent $NaAlO_2$, and 69 grams of sodium hydroxide (97% NaOH), contained in 204.4 grams of water, was added with rapid stirring to 1632.8 grams of a commercially available colloidal silica sol containing 30 wt. percent silica ("Ludox" solution, supplied by E. I. du Pont & Co.). Mixing was conducted at ambient temperature of 75° F. The vessel originally containing the sodium aluninate slurry was rinsed with an additional 25 grams of water which was added to the reaction slurry. Rapid stirring was continued to form a homogeneous mixture. The total molar composition of the resultant reaction mixture was as follows: 8.16 mols $SiO_2$; 2.10 mols $Na_2O$; 1.243 mols $Al_2O_3$; 82.3 mols $H_2O$. This represented an empirical molecular formula for the reaction mixture of 1.69 $Na_2O:Al_2O_3:6.56\ SiO_2:66.1\ H_2O$, with the total solids content of the slurry being 33.5 wt. percent. The composite slurry was then kept at ambient temperature with stirring for a digestion period of about 4 hours, after which time it was placed in an open flask in an oven at 212° F. for a period of 75 minutes. The flask was then sealed to eliminate evaporation losses and heated in the 212° F. oven for an additional 23.5 hours which was the point of maximum crystallinity as determined by periodic sampling and analysis. The flask was then withdrawn from the oven, opened, and an additional 2000 cc. of water was added to quench the crystallization process.

The crystallinity of the product crystals was determined by withdrawal of a small sample of the solids contained in the reaction mixture and analysis by X-ray diffraction techniques. The product was identified as 100% Type Y zeolite having a crystallinity of 134% as determined by comparison with a standard laboratory sample. This standard laboratory sample was prepared by the above reaction technique using reactant ratios shown in Table I.

Percent crystallinity is hereby defined as the ratio between the sum of the intensities of the ten strongest lines of the X-ray diffraction pattern of the unknown sample and the sum of the intensities of the same ten lines for the standard laboratory sample, multiplied by 100. The sum of the intensities of the ten strongest lines for the standard laboratory sample was 172.

(As an illustration, a typical Type Y zeolite preparation produces a product having an X-ray diffraction pattern with the following ten strongest lines. The intensities refer to observed peak heights on an X-ray spectrometer trace.

| hkl | d (A.) | Intensity |
| --- | --- | --- |
| 111 | 14.27 | 88.4 |
| 220 | 8.740 | 13.0 |
| 311 | 7.453 | 9.5 |
| 331 | 5.671 | 20.0 |
| 333 | 4.757 | 10.0 |
| 440 | 4.370 | 12.5 |
| 533 | 3.770 | 19.4 |
| 642 | 3.303 | 10.1 |
| 555 | 2.854 | 10.1 |
| 664 | 2.635 | 5.0 |
| Total | | 198.0 |

Since the sum of the above intensities equals 198, the percent crystallinity of this product is $198/172 \times 100$, or 115%.)

The X-ray diffraction traces for all of the examples given herein were recorded under instrument conditions identical to those used with the standard laboratory sample. The crystallinity is thus expressed as a percent of the standard laboratory sample crystallinity and may be simply calculated by dividing the sum of the intensities of the ten strongest lines of the X-ray diffraction trace by the constant 1.72.

In accordance with the present invention, 78.5 lbs. of a commercially available silica-alumina hydrogel having a composition of about 87% $SiO_2$ and 13% $Al_2O_3$ on a dry solids basis, and containing 10.9% dry solids was slurried with 71.5 lbs. of water and the total mixture was passed through a colloid mill to thereby revert the hydrogel to a hydrosol to fluidize it for handling and pumping purposes. The total slurry of crystalline Type Y zeolite contained in its mother liquor prepared as described above was then added with stirring to the reverted silica-alumina hydrogel, and the composite mixture was recirculated through a colloid mill to ensure a fine dispersion of the crystalline zeolite throughout the hydrogel. The resulting fluid dispersion was then spray dried by feeding it to a heated chamber with down-flowing hot air at a temperature of 550 to 600° F. at the inlet and about 240° F. at the bottom of the drying chamber.

The spray dried composite product, consisting of Type Y zeolite embedded in silica-alumina matrix, was then added to 100 lbs. of a 5% magnesium nitrate solution, and heated to 160° F. for about 1 hour with slow, intermittent stirring. Stirring was stopped and the solids were allowed to settle. The supernatant liquor was removed by decantation, and the crystals were then washed by reslurrying in about 50 lbs. of water, followed by settling and decantation. This exchange and washing procedure was repeated three more times, and the product was filtered, water washed, oven dried and then calcined at 1000° F. for 16 hours. The final product, designated "Catalyst A," comprised 10% crystalline zeolite Type Y embedded in 90 wt. percent of silica-alumina hydrogel matrix. This represented a zeolite yield of about 60% based on the weight of total solids in the original reaction mixture prior to addition of the silica-alumina reverted hydrogel.

*Part B.—Preparation of zeolite Y-matrix by prior art process*

A Type Y zeolite-matrix composite product was prepared by a prior art process as follows. The same procedure as described in Part A was used except that the zeolite product crystals were separated from their mother liquor by filtration and centrifugation, and the separated crystals, after washing, were conventionally ion-exchanged four times with magnesium salt solution, washed and dried. The preformed, dry magnesium-form zeolite crystals were then combined with the silica-alumina hydrogel.

Specifically, after the crystallization of the zeolite product, the total product slurry was diluted with about 10 volumes of water and stirred. The mixture was allowed to settle for 24 hours without agitation, after which time only an extremely small proportion of the total solids was observed to have settled to the bottom of the container. The slurry was then filtered using a conventional vacuum filter. A very short time after suction was applied, the fine crystals plugged the pores of the filter cloth so that very little liquid could subsequently be removed. The mixture was then subjected to centrifugation in a high speed Sharples solid bowl type centrifuge wherein about 80% of the liquid was removed per pass. Three passes through the centrifuge were required to effect total separation of the product crystals. The crystalline product was oven dried at 250° F. Upon weighing it was found that only about a 50% yield of the original solids present in the slurry were recovered due to handling losses, thus demonstrating the extreme difficulty in filtering and centrifuging the zeolite product crystals obtained in this manner. This is considerably lower than the yield of crystals recovered when using the process of the invention. The recovered oven dried crystals were then ion-exchanged with a 5% magnesium sulfate solution following the procedure of Part A. The final washed and dried product was analyzed and exhibited a crystallinity of only 98%, and contained 4.71% $Na_2O$ and 5.8% MgO.

In a separate vessel, 100 lbs. of the commercially available silica-alumina hydrogel used in Part A (containing 10.9 wt. percent solids) was diluted with 100 lbs. of water and the total mixture was passed through a colloid mill to revert the hydrogel to a hydrosol. 485 grams of the dry magnesium-exchanged Type Y zeolite described above, was then added to the hydrosol, and the composite mixture was passed through the colloid mill to produce a uniform homogeneous dispersion. The total resulting slurry was then spray dried, washed and calcined in a manner similar to Example 1. The resulting product was designated "Catalyst B" and consisted of 10% crystalline Type Y zeolite embedded in 90% of silica-alumina hydrogel matrix.

EXAMPLE 2

This example illustrates the catalytic cracking ability of Catalysts "A" and "B" of Example 1. For further purposes of comparison, a commercial gel type cracking catalyst without crystalline structure comprising 25% alumina and 75% silica was used as a reference catalyst, and was designated "Catalyst C." All the catalysts, "A," "B," and "C," were microspherical in shape with a preponderance of particles (e.g. about 90%) in the size range of 20 to 80 microns in diameter. Each was calcined in air at 1000° F. for 16 hours and then steamed at 1400° F. at atmospheric pressure for an additional 16 hours.

The catalysts were separately tested for their ability to convert a heavy West Texas virgin gas oil having a boiling range of 650 to 875° F., a sulfur content of 1.1%, and an A.P.I. gravity of 26.9, in a fluidized bed cracking unit in batchwise operation. The tests were conducted using a 3-minute cycle time at 960° F. in all cases. The results of these tests are indicated in the following table, and are expressed for the same conversion level (equal to 75% to material boiling below 430° F.).

TABLE III.—CRACKING PERFORMANCE
[West Texas Virgin Gas Oil; 960° F.; 3 Minute Cycle]

| Description | Catalyst | | |
|---|---|---|---|
| | A | B | C |
| | Zeolite Y-mother liquor slurry admixed in reverted $SiO_2$-$Al_2O_3$ hydrogel. Exchanged with Mg salt | Preformed dried Mg-Zeolite Y admixed in $SiO_2$-$Al_2O_3$ hydrogel matrix | Commercial $SiO_2$-$Al_2O_3$ gel catalyst |
| Conversion, Wt. Percent 430° F.- | 75 | 75 | 75 |
| Carbon, Wt. Percent | 4.2 | 6.7 | 8.6 |
| $C_3$—Dry Gas, Wt. Percent | 9.5 | 13.9 | 14.0 |
| Total $C_4$, Wt. Percent | 10.5 | 9.9 | 13.5 |
| $C_5$— 430° F. Naphtha, Wt. Percent | 50 | 44.5 | 39 |

As shown in Table III, Catalyst A, produced by the process of the present invention, exhibited superior cracking performance as compared to Catalyst B or C. When compared to the reference amorphous Catalyst C, Catalyst A is shown to have produced significantly less carbon (i.e. about 50% less) and significantly higher naphtha yield. Similarly, when compared to Catalyst B, i.e. the product formed by mixing dry preformed zeolite crystals into the silica-alumina reverted hydrogel, Catalyst A also showed significantly lower carbon make and significantly higher naphtha yield and additionally provided a substantial selectivity advantage. Thus, the amount of dry gas make was considerably reduced while the total $C_4$ make increased.

It is seen, therefore, that in addition to the distinct advantages made available by the process of the present invention as regards the elimination of the time-consuming and laborious separation of the zeolite crystals from their mother liquor, the process of the invention additionally provides a greatly improved product capable of exhibiting superior catalytic ability as compared to conventional catalysts and to catalysts prepared by prior art procedures involving the distinct separation of the zeolite crystals from their mother liquor.

In summary, the present invention relates to a process for synthetically producing crystalline alumino-silicate "molecular sieve" zeolitic materials which are useful for adsorption and hydrocarbon conversion purposes, which process comprises the steps of forming said zeolitic material by methods known in the art, combining the product slurry contained in its mother liquor without separation of product crystals with an aqueous silica-metal oxide cogel slurry, and then subjecting the total mixture to a rapid evaporation step to form a composite material comprising said zeolite embedded in a cogel matrix which is suitable for fluidized bed, moving bed, and fixed bed type operations, has high resistance to attrition, and, when suitably base exchanged, exhibits superior catalytic ability.

What is claimed is:
1. An improved process for preparing crystalline alumino-silicate zeolite having uniformly dimensioned pores and embedded in a silica-metal oxide cogel matrix which comprises crystallizing said zeolite from an aqueous reaction mixture containing silica, alumina, and sodium oxide, at elevated temperature to form a product slurry mixture comprising zeolite product crystals and mother liquor; admixing said product slurry mixture with an aqueous cogel slurry comprising a cogel of hydrous silica and at least one other hydrous metal oxide to form a fluid admixture; and subjecting said fluid admixture to a rapid drying operation to form a composite material comprising said zeolite embedded in said cogel matrix.

2. The process of claim 1 wherein said elevated temperature is within the range of 180° to 250° F. and said reaction mixture is aged at said temperature for a time sufficient to crystallize said zeolite.

3. The process of claim 1, wherein said other hydrous metal oxide in said aqueous cogel slurry is selected from the group consisting of oxides of metals of Groups II–A, III–A, and IV–B of the Periodic Table.

4. The process of claim 1 wherein said other hydrous metal oxide in said aqueous cogel slurry is alumina.

5. The process of claim 1 which additionally comprises subjecting the dried zeolite-cogel matrix composite to base exchange with an aqueous solution of an ion capable of reducing the $Na_2O$ content to less than 10 wt. percent based on the weight of said zeolite.

6. The process of claim 5, wherein said ion is selected from the group consisting of hydrogen-containing cations; cations of metals in Groups II, III, IV, V, VI–B, VII–B, VIII; and cations of rare earth metals.

7. A crystalline zeolite-cogel matrix product produced by the process of claim 1.

8. An improved process for preparing crystalline alumino-silicate zeolite embedded in a silica-metal oxide cogel matrix, said zeolite having uniformly dimensioned pores and the followng molar ratio of constituents:

$$0.9 \pm 0.2 Na_2O : Al_2O_3 : XSiO_2$$

wherein X has a value above 3, which comprises crystallizing said zeolite from an aqueous reaction mixture containing $Na_2O$, $SiO_2$ and $Al_2O_3$ at elevated temperature, wherein the molar ratios of the constituents in the reaction mixture are within the following ranges:

| | |
|---|---|
| $Na_2O/SiO_2$ | 0.25 to 0.60. |
| $SiO_2/Al_2O_3$ | 4 to less than 8. |
| $H_2O/Na_2O$ | 20 to 40. |
| $Na_2O/Al_2O_3$ | 1.6 to 3.5. | to form a product slurry mixture comprising zeolite product crystals and mother liquor; admixing said product slurry mixture with an aqueous cogel slurry comprising a cogel of hydrous silica and at least one other hydrous metal oxide, to form a fluid admixture; and subjecting said fluid admixture to a rapid drying operation to form a composite material comprising said zeolite embedded in said cogel matrix.

9. The process of claim 8 wherein said elevated temperature is within the range of 180° to 250° F. and said reaction mixture is aged at said temperature for a time sufficient to crystallize said zeolite.

10. The process of claim 9 wherein said reaction mixture is aged at said temperature for a period of 5 to 50 hours.

11. The process of claim 10 which additionally comprises aging said reaction mixture for a period of up to about 40 hours at a temperature of about 60 to 100° F. prior to crystallization at said elevated temperature.

12. The process of claim 8 wherein said other metal oxide in said aqueous cogel slurry is selected from the group consisting of oxides of metals of Groups II–A, III–A, and IV–B of the Periodic Table.

13. The process of claim 8 wherein said other metal oxide in said aqueous cogel slurry is alumina.

14. The process of claim 8 which additionally comprises subjecting the dried zeolite-cogel matrix composite to base exchange with an aqueous solution of an ion selected from group consisting of hydrogen-containing cations; cations of metals in Groups II, III, IV, V, VI–B, VII–B, VIII; and cations of rare earth metals.

15. The process of claim 8 wherein said rapid drying operation is spray drying.

16. A crystalline zeolite-cogel matrix product produced by the process of claim 8.

References Cited

UNITED STATES PATENTS

| | | | |
|---|---|---|---|
| 2,882,243 | 4/1959 | Milton | 252—455 |
| 3,250,728 | 5/1966 | Miale et al. | 252—455 |

FOREIGN PATENTS 650,503   10/1962   Canada.

DANIEL E. WYMAN, *Primary Examiner.*

OSCAR R. VERTIZ, *Examiner.*

H. S. MILLER, C. F. DEES, *Assistant Examiners.*